US006920605B1

(12) United States Patent
Challenger et al.

(10) Patent No.: US 6,920,605 B1
(45) Date of Patent: Jul. 19, 2005

(54) METHOD AND SYSTEM FOR RAPID PUBLISHING AND CENSORING INFORMATION

(75) Inventors: James R. H. Challenger, Garrison, NY (US); Cameron Ferstat, Sleepy Hollow, NY (US); Arun K. Iyengar, Yorktown Heights, NY (US); Paul Reed, Harrison, NY (US); Gerald A. Spivak, Mohegan Lake, NY (US); Karen A. Witting, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 09/283,562

(22) Filed: Apr. 1, 1999

(51) Int. Cl.[7] .............................................. G06F 15/00
(52) U.S. Cl. .................................... 715/501.1; 715/515
(58) Field of Search ........................ 707/514; 715/514, 715/500, 501.1, 500.1, 515

(56) References Cited

U.S. PATENT DOCUMENTS

| | | | | |
|---|---|---|---|---|
| 5,040,142 | A | | 8/1991 | Mori et al. |
| 5,530,520 | A | * | 6/1996 | Clearwater ................... 399/366 |
| 5,625,818 | A | * | 4/1997 | Zarmer et al. ........... 707/104.1 |
| 5,651,117 | A | * | 7/1997 | Arbuckle ......................... 705/4 |
| 5,684,984 | A | * | 11/1997 | Jones et al. ..................... 707/10 |
| 5,832,212 | A | * | 11/1998 | Cragun et al. ............... 713/202 |
| 5,940,834 | A | * | 8/1999 | Pinard et al. ................ 707/102 |
| 5,987,606 | A | * | 11/1999 | Cirasole et al. ............. 713/200 |
| 6,026,474 | A | * | 2/2000 | Carter et al. ................ 711/202 |
| 6,052,514 | A | * | 4/2000 | Gill et al. .................... 345/733 |
| 6,199,081 | B1 | * | 3/2001 | Meyerzon et al. .......... 707/513 |
| 6,268,851 | B1 | * | 7/2001 | Bricklin et al. ............. 345/744 |
| 6,282,539 | B1 | * | 8/2001 | Luca .............................. 707/6 |
| 6,282,548 | B1 | * | 8/2001 | Burner et al. ............ 707/104.1 |
| 6,314,456 | B1 | * | 11/2001 | Van Andel et al. ......... 709/218 |
| 6,385,655 | B1 | * | 5/2002 | Smith et al. ................. 709/232 |
| 6,424,995 | B1 | * | 7/2002 | Shuman ....................... 709/206 |
| 6,442,598 | B1 | * | 8/2002 | Wright et al. ................ 709/217 |
| 6,484,149 | B1 | * | 11/2002 | Jammes et al. ................ 705/26 |
| 6,618,751 | B1 | * | 9/2003 | Challenger et al. ......... 709/213 |
| 6,782,427 | B1 | * | 8/2004 | Van Andel et al. ......... 709/231 |

OTHER PUBLICATIONS

So et al., Allocating Data Objects to Multiple Sites for Fast Browsing of Hypermedia Documents, IEEE Aug. 1998, pp. 406 411.*

Anupam et al., Personalizing the Web Using Site Descriptions, IEEE Sep. 1999, pp. 732–738.*

Hoashi et al., Data Collection for Evaluating Automatic Filtering of Hazardous WWW Information, IEEE Feb. 1999, pp. 157–164.*

Noronha et al., "Extending a Structured Document Model with Version Control", Proceedings, 15th Annual Computer Security Applications Conference, Dec. 1999, pp. 234–242.

European Search Report.

* cited by examiner

*Primary Examiner*—Stephen Hong
*Assistant Examiner*—Cong-Lac Huynh
(74) *Attorney, Agent, or Firm*—Frank V. DeRosa

(57) ABSTRACT

A method for constructing and publishing a plurality of objects, in accordance with the present invention, includes the steps of providing a plurality of fragments, constructing objects from the plurality of fragments, delaying publication of at least one of the objects, where the at least one of the objects includes at least one fragment belonging to a first class, to examine content, and publishing at least one of the objects including at least one of the fragments belonging to a second class without examining content. A program storage device for implementation of the present invention is also included.

22 Claims, 4 Drawing Sheets

METHOD AND SYSTEM FOR RAPID PUBLISHING AND CENSORING INFORMATION

BACKGROUND OF THE INVENTION

1. Field of the Invention

The present invention relates to computerized publication of documents, and more particularly to a method for quickly publishing and censoring information to be incorporated in the documents.

2. Description of the Related Art

In many situations in electronic publishing, it is desirable to quickly publish some news to the outside world while applying a more rigorous censoring and filtering process to other news. A specific example includes Web sites for sporting events. At these Web sites, the latest results from sporting events should be made public to the outside world, immediately. By contrast, background stories written about the event or its participants do not have to be as current. However, such stories must be examined by a censor to make sure that they are correct and appropriate. This may result in considerable delay in publication.

This delay in publication problem has been dealt with by dividing publishable entities into two categories. Entities belonging to the fast category are published immediately. Entities belonging to the slow category are placed on a queue to be examined by one or more censors before publication. This prior art solution may not be acceptable for use with all systems.

Therefore, a need exists for a system and method for generating complex Web pages which result in more flexibility in Web page design and better performance than conventional approaches of treating entire Web pages as single logical entities. A further need exists for a method for permitting a single Web page to include multiple fragments wherein some of the included fragments belong to the fast category and others belong to the slow category.

SUMMARY OF THE INVENTION

A method for constructing and publishing a plurality of objects, in accordance with the present invention, includes the steps of providing a plurality of fragments, constructing objects from the plurality of fragments, delaying publication of at least one of the objects, where the at least one of the objects includes at least one fragment belonging to a first class, to examine content, and publishing at least one of the objects including at least one of the fragments belonging to a second class without examining content.

Another method for constructing and publishing a plurality of objects, in accordance with the present invention, includes the steps of providing a plurality of fragments, the fragments including one of immediately publishable information and censorable information, constructing objects from the plurality of fragments, delaying publication until contents of the objects are approved where the objects include at least one fragment including censorable information and immediately publishing the objects including only fragments including immediately publishable information.

In alternate methods, the step of dividing the plurality of fragments into at least two classes may be included. The fragments in the first class may include censorable material, and the fragments in the second class may include immediately publishable material. A compound object may be included with an immediately publishable fragment. The step of delaying publication may further include the steps of, in response to an update to the immediately publishable fragment, updating the compound object after initial construction of the compound object and before the compound object is examined for content to determine whether the compound object is immediately publishable. The methods may further include the step of examining the compound object for content when the compound object is other than immediately publishable. The step of delaying publication may include the step of preventing publication of objects in accordance with the examined content. The step of examining content may be performed in multiple stages. The step of notifying an author of the prevented publication to permit the author to fix inappropriate content of the objects prevented from publication may be included.

A program storage device readable by machine, tangibly embodying a program of instructions executable by the machine to perform method steps for constructing and publishing a plurality of objects, the method steps include receiving a plurality of fragments, constructing objects from the plurality of fragments, delaying publication of the objects where the objects include at least one fragment belonging to a first class, to examine content and publishing the objects including only fragments belonging to a second class without examining content.

In alternate embodiments, the program storage device may implement the step of dividing the plurality of fragments into at least two classes. The fragments in the first class may include censorable material, and the fragments in the second class may include immediately publishable material. The program storage device may receive a compound object including an immediately publishable fragment, and the step of delaying publication may include the step of in response to an update to the immediately publishable fragment, updating the compound object after initial construction of the compound object and before the compound object is examined for content to determine whether the compound object is immediately publishable. The program storage device may include the step of examining the compound object for content when the compound object is other than immediately publishable. The step of delaying publication may include the step of preventing publication of objects in accordance with the examined content. The step of examining content may be performed in multiple stages.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
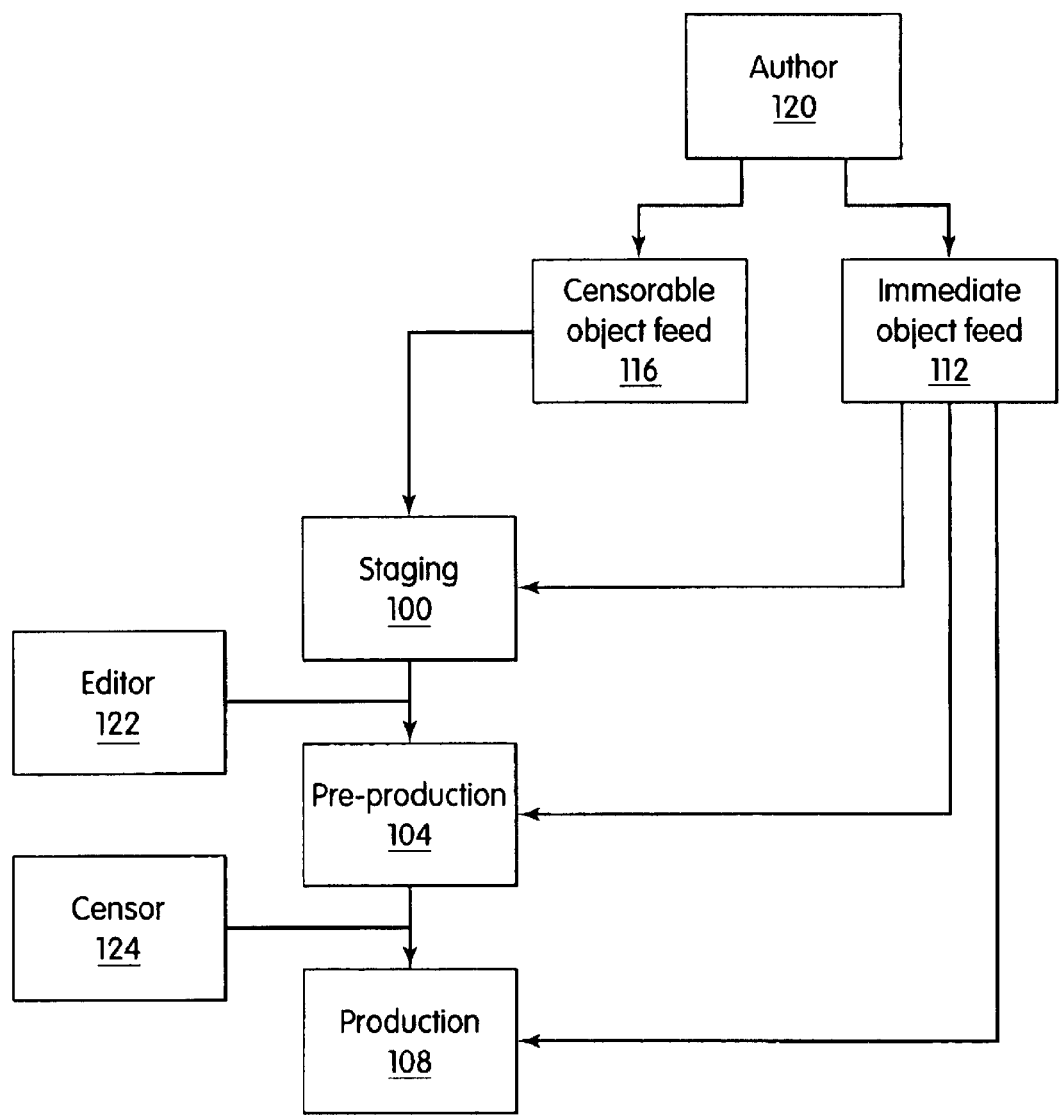
FIG. 1 is a block/flow diagram for a system/method for quickly publishing and censoring information in accordance with the present invention.

The present invention includes a system and method for rapid publishing and censoring information, particularly on the World Wide Web. The present invention generates complex Web pages from fragments. This results in more flexibility in Web page design and improved performance over conventional approaches which treat entire Web pages as single logical entities. In accordance with the present invention, a single Web page may include multiple fragments wherein some of the included fragments belong to a fast category and other fragments belong to the slow category.

In the context of Web pages, the present invention updates pages from two or more classes of sources which may include authors and results feeds. A servable is a complete entity which may be published. For example, a Web page could be a servable at a Web site. Authors also create news stories or the like which may be censored and hence may be created as slow fragments. Results feeds deliver up to date results for events and the like, for example sporting events, which should be reported immediately and hence may be created as fast fragments. A fragment is an object which is used to construct a compound object. An object is an entity which can either be published or is used to create something which is publishable. Objects include both fragments and compound objects. A compound object is an object constructed from one or more fragments.

Authors create new versions of Web pages in an area of a system known as a staging area. This is performed by specifying inclusions relationships among compound objects and fragments via a markup language which is then parsed to obtain an object dependence graph. An object dependence graph (ODG) is a directed graph in which nodes/vertices correspond to objects. ODG's may have one or more types of edges. For example, a dependence edge from a node corresponding to an object "a" terminating in a node corresponding to an object "b" indicates that a change to "a" also affects "b". The present invention automatically renders pages which the author has specified using the markup language so that the author can view the pages. The present invention does this by applying graph traversal techniques on the ODG to determine an optimal order for constructing the objects. ODG are also described in a commonly assigned disclosure, U.S. Ser. No. 08/905,114 incorporated herein by reference.

Results feeds are connected to staging. While the author is creating new pages, the author may see new results due to the presence of results feeds.

After the author is satisfied with the content of the pages, the pages are sent to a new area of the system of the present invention known as pre-production. A set of servable Web pages which the author sends is known as a bundle. A bundle is a set of servables. In the system of the present invention, servables belonging to the same bundle may be published together. In pre-production, the bundle is examined by a censor. After the censor approves of all the pages in a bundles the pages are published. Publishing an object (or page) means making it visible to a specific group of people (e.g. the public, one or more editors, one or more censors). Publishing is decoupled from creating or updating an object and generally takes place after the object has been created or updated. If the censor rejects any page in the bundle, the entire bundle may be rejected and may need to be fixed by an author before it can be published.

In a preferred embodiment, a censor should not publish some pages of a bundle and not others because this may violate consistency constraints. It is possible to combine two or more bundles within pre-production. If combining bundles results in multiple versions of the same servable Web page, the latest version replaces all prior versions. The latest results may constantly be fed asynchronously by the results feeds. Fast fragments from results feeds are directly incorporated into servable Web pages which have been published, are awaiting approval from a censor in pre-production and are being rendered by authors in staging. Graph traversal algorithms on the ODG are used to determine objects affected by new results and an optimal order for constructing them.

It should be understood that the elements shown in FIGS. 1–4 may be implemented in various forms of hardware, software or combinations thereof unless otherwise specified. Preferably, these elements are implemented in software on one or more appropriately programmed general purpose digital computers having a processor and memory and input/output interfaces. Referring now to the drawings in which like numerals represent the same or similar elements and initially to FIG. 1, a block/flow diagram of a system/method in accordance with the present invention is shown. Updates to objects occur from at least two types of sources. One type may be immediate object feeds 112 and another may be censorable object feeds 116. There may be one or more immediate object feeds 112. Similarly, there may be one or more censorable object feeds 116. Immediate object feeds 112 may include but are not limited to humans, machines, or some combination of humans and machines. Similarly, censorable object feeds 116 may comprise but are not limited to humans, machines, or some combination of humans and machines.

Censorable object feeds 116 generally make changes (possibly including object creation or deletion) to objects which are to be proofread by editor(s) 122 and censor(s) 124 before the changes can be made public. Immediate object feeds 112 generally make changes (possibly including object creation or deletion) to objects which should be made public quickly with as few delays as possible. For example, at a sporting event Web site, up-to-date information on who is winning, the latest scores, etc. might be provided by an immediate object feed 112. Background stories on athletes might be provided by a censorable object feed 116. Objects coming out of an immediate object feed 112 are known as immediate objects. Objects coming out of a censorable object feed 116 are known as censorable objects. More than two types of feeds may also be used. One or more authors 120 may optionally exist. Authors 120 may include but are not limited to humans, machines, or some combination of humans and machines. A particular author 120 may have the ability to create, delete, and modify at least some but not necessarily all objects.

Modifications to objects by authors 120 are fed through the censorable object feed 116 or the immediate object feed 112. The immediate object feed 112 publishes objects to all stages: staging 100, pre-production 104 and production 108. The censorable object feed 116 publishes objects only to staging 100.

While there are several methods for publishing compound objects, a preferred method is described in "METHOD AND SYSTEM FOR PUBLISHING DYNAMIC WEB DOCUMENTS", Ser. No. 09/283,542, filed concurrently herewith, commonly assigned and incorporated herein by reference.

Figure 2:
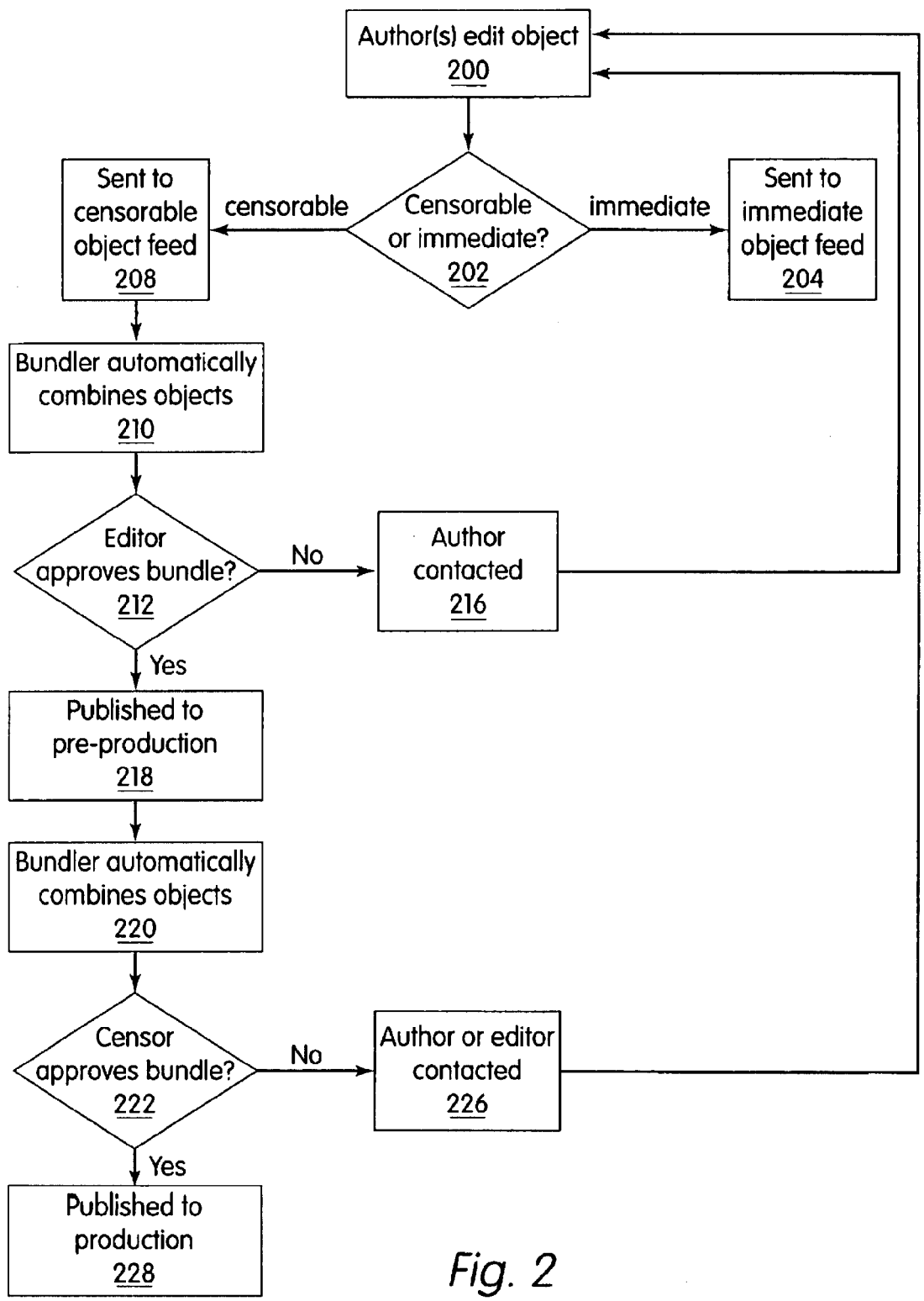
FIG. 2 is a flow diagram of a method for quickly publishing and censoring information in accordance with the present invention.

Referring to FIG. 2, a block diagram of a method for rapid publishing and censoring information is shown. In step 200, one or more authors edit an object or set of objects. Each object which is an immediate object is published using the immediate feed 112 (FIG. 1) to staging 100, pre-production 104 and production 108. Each object which is a censorable object is published through the censorable object feed 116 (FIG. 1) to only staging 100. In step 210, censorable objects are bundled by an automated system which identifies dependencies between objects and creates a bundle of objects that must be approved together. It is possible that two or more bundles will need to be combined. If combining bundles results in multiple versions of the same servable, the latest version replaces all prior versions.

In step 212, one or more editors 122 (FIG. 1) are presented with a list of bundled objects and asked to approve the bundle. The editor(s) 122 examine the bundle in order to determine if it can be published. The editor(s) 122 attempts to catch mistakes and prevent objectionable material from being published. If the editor(s) 122 approves of the bundle, all servables in the bundle are published together in pre-production 104, in step 218. If the editor(s) 122 finds any servables which should not be published, the entire bundle is rejected and the author(s) 120 is notified in step 216. The author(s) 120 can then modify content as needed to fix the problems identified by editor(s) 122. If this course of action is followed, processing returns to step 200. The editor 122 will usually not reject some pages in a bundle but publish the remainder because this could result in the publication of inconsistent information. The cycle just described may be replicated as many times as needed.

Also, depicted in FIG. 2 is a second stage, which moves objects from pre-production 104 to production 108. After the object(s) are bundled in step 220, one or more censors determine whether the objects meet guidelines and approves the bundles for publishing to production in step 228. If the censor does not approve, the author(s) and/or editor(s) are notified in step 226.

One or more immediate object feeds 112 may cause updates to objects in staging 100, pre-production 104, and/or production 108 (as depicted in FIG. 1). When updates are communicated by an immediate object feed 112, the system may attempt to propagate the update(s) to objects in staging 100, objects waiting for censor approval in pre-production 104, and published objects in production 108. While there are several methods for updating objects in response to new information from one or more object feeds, the preferred method is to maintain different ODG's corresponding to sets of objects in staging 100, pre-production 104, and production 108. Graph traversal algorithms such as those described in commonly assigned, "METHOD AND SYSTEM FOR EFFICIENTLY CONSTRUCTING AND CONSISTENTLY PUBLISHING WEB DOCUMENTS", Ser. No. 09/283,561, filed concurrently herewith, commonly assigned and incorporated herein by reference, can then be used to identify and update objects affected by new data from object feeds.

Figure 3:
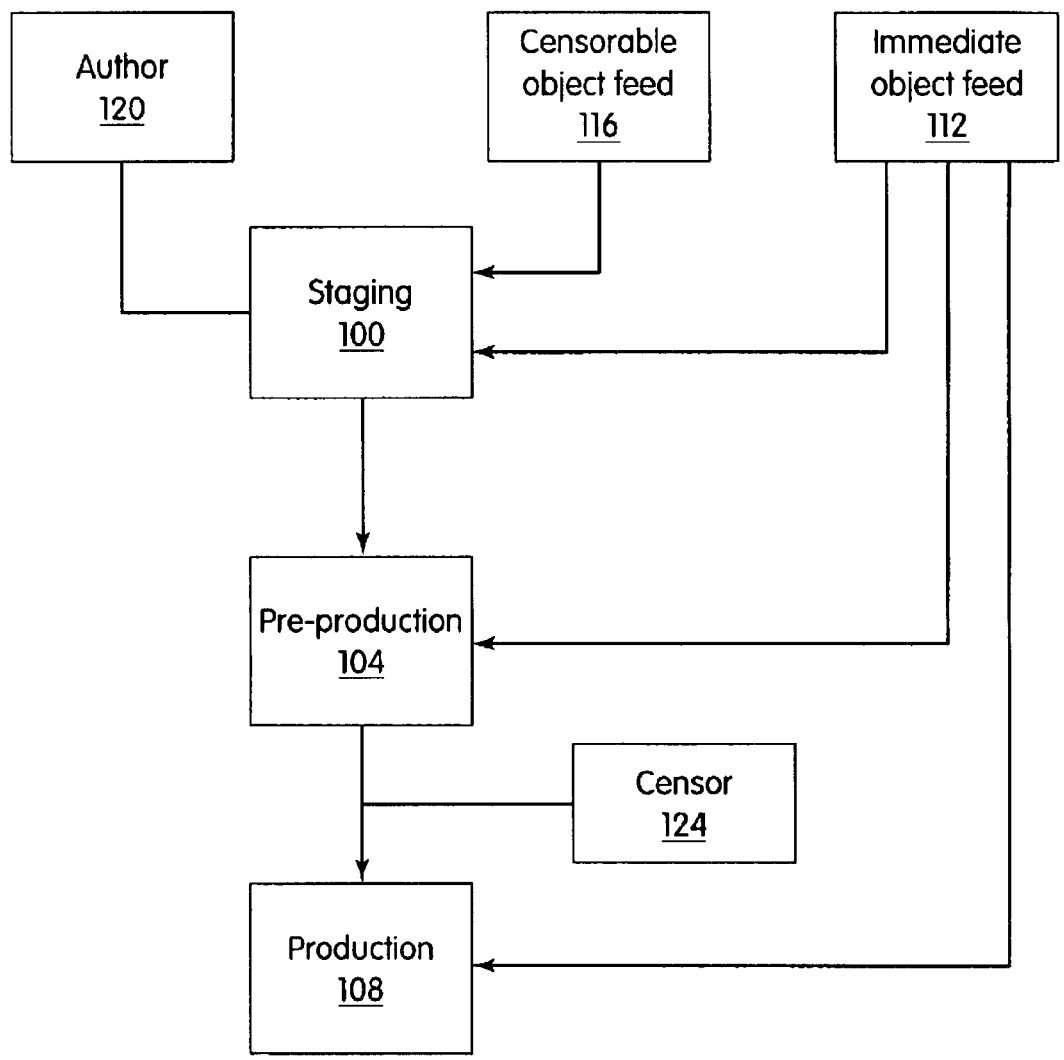
FIG. 3 is a block/flow diagram for an alternate embodiment of the system/method for quickly publishing and censoring information of FIG. 1 in accordance with the present invention.

Referring to FIG. 3, an alternative embodiment of the present invention is shown. FIG. 3 is similar to FIG. 1. However, editor 122 is eliminated in FIG. 3 and author 120 supplies input directly to staging 100. In this embodiment, the author does not provide direct input to the immediate object feed or censorable object feed. Instead, these object feeds come from an external source.

Figure 4:
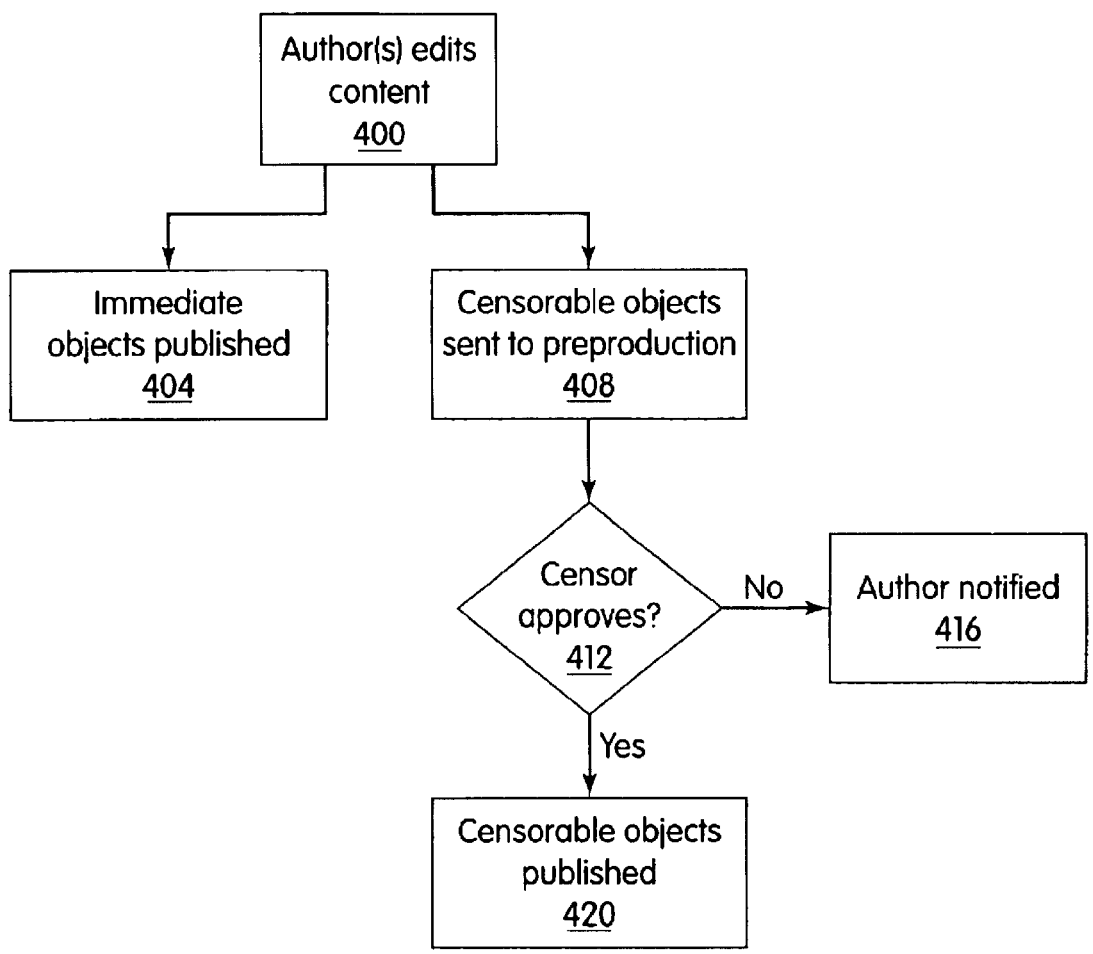
FIG. 4 is a block/flow diagram of the system/method of FIG. 3 for quickly publishing and censoring information in accordance with the present invention.

Referring to FIG. 4, a block/flow diagram of a system/method for quickly publishing and censoring information is shown. In block 400, one or more authors edit content. Authors 120 have the ability to create, delete, and modify at least some but not necessarily all objects. In particular, authors 120, have the ability to create, delete, and modify some but not necessarily all compound objects which include one or more fragments. Authors 120 make modifications to objects in an area of the system known as staging 100. While there are several methods for editing and constructing compound objects, the preferred method is the one described in "METHOD AND SYSTEM FOR PUBLISHING DYNAMIC WEB DOCUMENTS", previously incorporated by reference. Any change an author 120 makes to an object with the exception of merely changing which immediate objects are included and/or their positions results in a censorable object. If an author 120 changes which immediate objects are included and/or their positions within an immediate object "o", "o" remains immediate. If an author 120 changes which immediate objects are included and/or their positions within a censorable object "p", "p" remains censorable.

Objects in staging 100 have the potential to be updated by:
(1) One or more authors 120
(2) One or more immediate object feeds 112
(3) One or more censorable object feeds 116

Once an author (s) 120 has created a bundle of servables which he is satisfied with, all immediate objects are removed from the bundle and in block 404, are published immediately to production 108. If this leaves any censorable objects in the bundle, this set of objects "b" is then sent to pre-production in block 408. In block 412, one or more censors 124 examine "b" to determine if it can be published. The censor(s) 124 attempts to catch mistakes and prevent objectionable material from being published. If the censor(s) 124 approves of the bundle, all servables in the bundle are published together in production 108 in block 420. If the censor (s) 124 finds any servables which should not be published, the entire bundle is rejected and the author(s) 124 is notified in block 416. The author(s) 124 may then modify content as needed to fix the problems. If this course of action is followed, processing returns to step 400. The censor 124 will usually not reject some pages in a bundle but publish the remainder because this could result in the publication of inconsistent information. As described above, it is possible to combine two or more bundles within pre-production 104. If combining bundles results in multiple versions of the same servable, the latest version replaces all prior versions.

One or more immediate object feeds 112 may cause updates to objects in staging 100, pre-production 104, and/or production 108 (as depicted by the arrows in FIG. 3). When updates are communicated by an immediate object feed 112, the system may attempt to propagate the update(s) to objects in staging 100, objects waiting for censor approval in pre-production 104, and published objects in production 108. While there are several methods for updating objects in response to new information from one or more object feeds, a preferred method is to maintain different ODG's corresponding to sets of objects in staging 100, pre-production 104, and production 108. Graph traversal algorithms such as those described in "METHOD AND SYSTEM FOR EFFICIENTLY CONSTRUCTING AND CONSISTENTLY PUBLISHING WEB DOCUMENTS", previously incorporated by reference, can then be used to identify and update objects affected by new data from object feeds.

In accordance with the invention, many advantages are realized by utilizing fragments. Fast and slow fragments may advantageously be combined together on a single Web page, for example. The present invention may be used for publishing and censoring information on the Web as well as outside the Web.

Having described preferred embodiments of a system and method for rapid publishing and censoring information (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for constructing and publishing a plurality of objects comprising the steps of:

providing a plurality of fragments;

constructing objects from the plurality of fragments;

delaying publication of at least one of the objects, where the at least one of the objects includes at least one fragment belonging to a first class, to examine content; and publishing at least one of the objects including at least one of the fragments belonging to a second class without examining content.

2. The method as recited in claim 1, further comprising the step of dividing the plurality of fragments into at least two classes.

3. The method as recited in claim 1, wherein the fragments in the first class include censorable material.

4. The method as recited in claim 1, wherein the fragments in the second class include immediately publishable material.

5. The method as recited in claim 1, includes a compound object including an immediately publishable fragment, the step of delaying publication further comprising the step of:

in response to an update to the immediately publishable fragment, updating the compound object after initial construction of the compound object and before the compound object is examined for content to determine whether the compound object is immediately publishable.

6. The method as recited in claim 5, further comprising the step of examining the compound object for content when the compound object is other than immediately publishable.

7. The method as recited in claim 1, wherein the step of delaying publication further comprises the step of preventing publication of objects in accordance with the examined content.

8. The method as recited claim 1, wherein the step of examining content is performed in multiple stages.

9. A method for constructing and publishing a plurality of objects comprising the steps of:

providing a plurality of fragments, the fragments including one of immediately publishable information and censorable information;

constructing objects from the plurality of fragments;

delaying publication until contents of the objects are approved where the objects include at least one fragment including censorable information; and immediately publishing the objects including only fragments including immediately publishable information.

10. The method as recited in claim 9, includes a compound object including an immediately publishable fragment, the step of delaying publication further comprising the step of:

in response to an update to the immediately publishable fragment, updating the compound object after initial construction of the compound object and before the compound object is examined for content, to determine whether the compound object is immediately publishable.

11. The method as recited in claim 10, further comprising the step of examining the compound object for content when the compound object is other than immediately publishable.

12. The method as recited in claim 9, wherein the step of delaying publication further comprises the step of preventing publication of the objects in accordance with the examined content.

13. The method as recited in claim 12, further comprising the step of notifying an author of the prevented publication to permit the author to fix inappropriate content of the objects prevented from publication.

14. The method as recited claim in 9, further comprising the step of examining content in multiple stages.

15. A program storage device readable by machine, tangibly embodying a program of instructions executable by the machine to perform method steps for constructing and publishing a plurality of objects, the method steps comprising:

providing a plurality of fragments;

constructing objects from the plurality of fragments;

delaying publication of at least one of the objects, where the at least one of the objects includes at least one fragment belonging to a first class, to examine content; and publishing at least one of the objects including at least one of the fragments belonging to a second class without examining content.

16. The program storage device as recited in claim 15, further comprising the step of dividing the plurality of fragments into at least two classes.

17. The program storage device as recited in claim 15, wherein the fragments in the first class include censorable material.

18. The program storage device as recited in claim 15, wherein the fragments in the second class include immediately publishable material.

19. The program storage device as recited in claim 15, wherein the program storage device accesses a compound object including an immediately publishable fragment, the step of delaying publication further comprising the step of:

in response to an update to the immediately publishable fragment, updating the compound object after initial construction of the compound object and before the compound object is examined for content to determine whether the compound object is immediately publishable.

20. The program storage device as recited in claim 19, further comprising the step of examining the compound object for content when the compound object is other than immediately publishable.

21. The program storage device as recited in claim 15, wherein the step of delaying publication further comprises the step of preventing publication of objects in accordance with the examined content.

22. The program storage device as recited claim 15, wherein the content is examined in multiple stages.

* * * * *